US009113514B2

(12) United States Patent
Wang et al.

(10) Patent No.: US 9,113,514 B2
(45) Date of Patent: Aug. 18, 2015

(54) OUTDOOR LIGHTING NETWORK LIGHT CHANGE/OPTIMIZATION SYSTEM

(75) Inventors: Jianfeng Wang, Ossining, NY (US); Dave Alberto Tavares Cavalcanti, Mahopac, NY (US); Hongqiang Zhai, Ossining, NY (US); Kiran Srinivas Challapali, New City, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 33 days.

(21) Appl. No.: 14/009,533

(22) PCT Filed: Apr. 10, 2012

(86) PCT No.: PCT/IB2012/051737
§ 371 (c)(1),
(2), (4) Date: Oct. 3, 2013

(87) PCT Pub. No.: WO2012/143814
PCT Pub. Date: Oct. 26, 2012

(65) Prior Publication Data
US 2014/0028216 A1     Jan. 30, 2014

Related U.S. Application Data

(60) Provisional application No. 61/476,921, filed on Apr. 19, 2011.

(51) Int. Cl.
*H05B 33/08* (2006.01)
*H05B 37/02* (2006.01)

(52) U.S. Cl.
CPC ............ *H05B 33/08* (2013.01); *H05B 37/0245* (2013.01); *Y02B 20/72* (2013.01)

(58) Field of Classification Search
CPC .... H05B 33/08; H05B 37/0245; Y02B 20/72; G06F 13/42

USPC ............ 315/209 R, 291, 307, 308, 312, 318; 340/517, 521, 525, 565, 693.5
See application file for complete search history.

(56) References Cited

U.S. PATENT DOCUMENTS 6,016,038 A    1/2000  Mueller et al.
6,211,626 B1   4/2001  Lys et al.
(Continued)

FOREIGN PATENT DOCUMENTS

WO    2007003038 A1    1/2007
WO    2009066234 A2    5/2009

OTHER PUBLICATIONS

Yong et al, "The Road Lighting Control Technology Research Base on Ubiquitous Network" Engineering Research Center of Transportation Safety, IEEE, 2009, 4 pages.
(Continued)

*Primary Examiner* — Jimmy Vu

(57) ABSTRACT

Light management system for an outdoor lighting network (OLN) having lighting units, the system including a central control apparatus (40); lighting unit control apparatus (50); and a communication system (60). The central control apparatus (40) is operable to receive a configuration request; receive optimization objectives/constraints; identify the lighting units operably connected to the plurality of lighting unit control apparatus (50) associated with the configuration request; determine whether at least one of lighting requirements, illuminance model, and cost model have changed; update the lighting requirements, the illuminance and the cost model when at least one of the lighting requirements, the illuminance model, and the cost model have changed; optimize operation of the identified lighting units as a function of the optimization objectives/constraints, the lighting requirements, the illuminance and the cost model; and send an operation instruction to the lighting control apparatus (50).

15 Claims, 9 Drawing Sheets

(56) References Cited

U.S. PATENT DOCUMENTS

| | | |
|---|---|---|
| 8,567,982 B2 * | 10/2013 | Zampini et al. ............... 362/125 |
| 2007/0057807 A1 | 3/2007 | Walters et al. |
| 2010/0250106 A1 | 9/2010 | Bai et al. |
| 2010/0259931 A1 | 10/2010 | Chemel et al. |
| 2010/0262296 A1 | 10/2010 | Davis et al. |

OTHER PUBLICATIONS

Technical Options Guidebook, Money & Energy Saving Resources From the California Energy Commission, Pub. No. 400-02-005F, 2001, 63 pages.

Walta, "Co-Operative Vehicle-Roadside Systems, Deployment Issues and Concepts for Development", Master's Thesis, University of Twente, Vialis, Sep. 22, 2004, p. 1-82.

* cited by examiner

OUTDOOR LIGHTING NETWORK LIGHT CHANGE/OPTIMIZATION SYSTEM

CROSS-REFERENCE TO PRIOR APPLICATIONS

This application is the U.S. National Phase application under U.S.C. §371 of International Application No. PCT/2012/051737, filed on Apr. 10, 2012, which claims the benefit of U.S. Provisional Patent Application No. 61/476,921, filed Apr. 19, 2011. These applications are hereby incorporated by reference herein.

The technical field of this disclosure is outdoor lighting networks (OLNs), particularly, OLN light change/optimization systems.

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a controller for independently controlling the output of the LEDs in order to generate a variety of colors and color-changing lighting effects, for example, as discussed in detail in U.S. Pat. Nos. 6,016,038 and 6,211,626, incorporated herein by reference.

Outdoor lights, such as lighting for roadways, streets, parking facilities, parks, landscapes, footpaths, and bicycle paths, are normally managed by a single authority. For example, street lights in New York City are managed by the Department of Transportation. Central control by one authority allows better security, better coordination of use, and reduced maintenance cost. Most outdoor lights currently operate independently or in small groups supplied from a common power source. However, with the rise of the Internet and wireless communication systems, there is a trend toward networking of outdoor lights and managing operation of the outdoor lights through a centralized server.

The new generation lights like LEDs have the capability to adjust dimming level, color, direction (e.g., by tilting LED panels or digitally forming LED light beams), and/or harvesting various energy sources (e.g., solar/wind power). The new generation of light sources also frees the design of luminaires and fixtures to provide more choices for customers. In other words, the outdoor lighting network becomes more and more heterogeneous. This allows additional flexibility in saving energy, reducing light pollution, and complying with local lighting regulations. Unfortunately, the present generation of outdoor lighting does not employ a control and management system that is able to take advantage of this flexibility.

Current lighting systems are inflexible and fail to allow for changes in the systems. Lighting design is performed prior to installation and light commissioning is performed once after installation, after which the operation is set for the rest of the system's life. Each lighting unit is individually and manually tuned to fit one specific condition. The compliance process is typically performed at the lighting design stage, and only a few measurements taken after deployment.

When conditions change (e.g., light requirements, light unit characteristics, the number of lighting units covering a given area, or the surrounding lighting environment changes, e.g., other sources of lighting are introduced by new buildings, new displays, or the like), the lighting systems operation is no longer the most efficient and optimal. For example, luminaires are manufactured to meet certain performance standards, but the actual needs for a given area may change after the luminaires are deployed. The luminaire can remain in its initial deployment configuration for the 10 to 15 year lifetime of the luminaire. In the case of an outdoor lighting network, there can be a large number of lighting units deployed all over a city, for instance in the tens of thousands. Currently, there is no convenient way to re-configure the performance of the lighting systems to meet new performance and operational requirements. Moreover, the multiple light units are not coordinated for optimum lighting performance, minimal energy cost, minimal operation cost, or whatever performance the lighting system manager might desire.

Another problem is obtaining real-time, post installation or continuous measurement of OLN lighting performance. Measurements in most outdoor lighting systems are, at best, performed once after installation and commissioning, typically by specialists using specialized measurement devices, such as light meters. Adaptive outdoor lighting applications have been proposed, but they typically use dedicated or specialized sensors installed at a fixed location, e.g., in luminaires themselves or in their vicinity. Other lighting adaptation concepts based on more advanced sensors, such as cameras or occupancy sensors, have also been proposed. However, these systems also rely on dedicated sensors installed at fixed locations, and in many cases, cost and complexity of advanced sensors limit their large scale deployment and market acceptance. Yet another problem is the placement of fixed sensors: sensors used to detect daylight so lamps can be turned on at dusk and off at dawn are installed on top of the luminaires, and so are not appropriate for measuring lighting performance as seen by users at ground level.

It would be desirable to have an OLN light change/optimization system that would overcome the above disadvantages.

One aspect of the invention provides a light management system for an outdoor lighting network (OLN) having a plurality of lighting units, the system including a central control apparatus; a plurality of lighting unit control apparatus; and a communication system operably connecting the central control apparatus and the lighting unit control apparatus. The central control apparatus is operable to: receive a configuration request; receive optimization objectives/constraints; identify the lighting units operably connected to the plurality of lighting unit control apparatus associated with the configuration request; determine whether at least one of lighting requirements, illuminance model, and cost model have changed; update at least one of the lighting requirements, the illuminance model, and the cost model when at least one of the lighting requirements, the illuminance model, and the cost model have changed; optimize operation of the identified lighting units as a function of the optimization objectives/constraints, the lighting requirements, the illuminance model, and the cost model; and send an operation instruction to the plurality of lighting control apparatus to direct the identified lighting units to operate in accordance with the optimized operation.

Another aspect of the invention provides a user control apparatus operably connected to a central control apparatus of an outdoor lighting network (OLN), the apparatus including a processor; a memory operably connected to the processor; and a communication module operably connected to the processor for communication with the central control apparatus. The processor is operable to: generate lighting requirements; and transmit the lighting requirements through the communication module to the central control apparatus.

Another aspect of the invention provides a central control apparatus to optimize an outdoor lighting network (OLN), the apparatus including a processor; a memory operably connected to the processor; and a communication module operably connected to the processor for communication with the outdoor lighting network. The processor is operable to: receive a configuration request; receive optimization objectives/constraints; identify lighting units associated with the configuration request; determine whether at least one of lighting requirements, illuminance model, and cost model have changed; update at least one of the lighting requirements, the illuminance model, and the cost model when at least one of the lighting requirements, the illuminance model, and the cost model have changed; optimize operation of the identified lighting units as a function of the optimization objectives/constraints, the lighting requirements, the illuminance model, and the cost model; and direct the identified lighting units to operate in accordance with the optimized operation.

Another aspect of the invention provides a lighting unit control apparatus operably connected to a lighting unit and a central control apparatus of an outdoor lighting network (OLN), the apparatus including a processor; a memory operably connected to the processor; and a communication module operably connected to the processor for communication with the central control apparatus. The processor is operable to: generate a configuration request; transmit the configuration request through the communication module to the central control apparatus; receive an operation instruction for optimized operation of the lighting unit through the communication module from the central control apparatus; and direct the lighting unit to operate in accordance with the operation instruction.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

In the drawing figures, like reference characters generally refer to the same parts throughout the different views. Also, the drawing figures are not necessarily to scale, emphasis instead generally being placed upon illustrating the principles of the invention.

Figure 1:
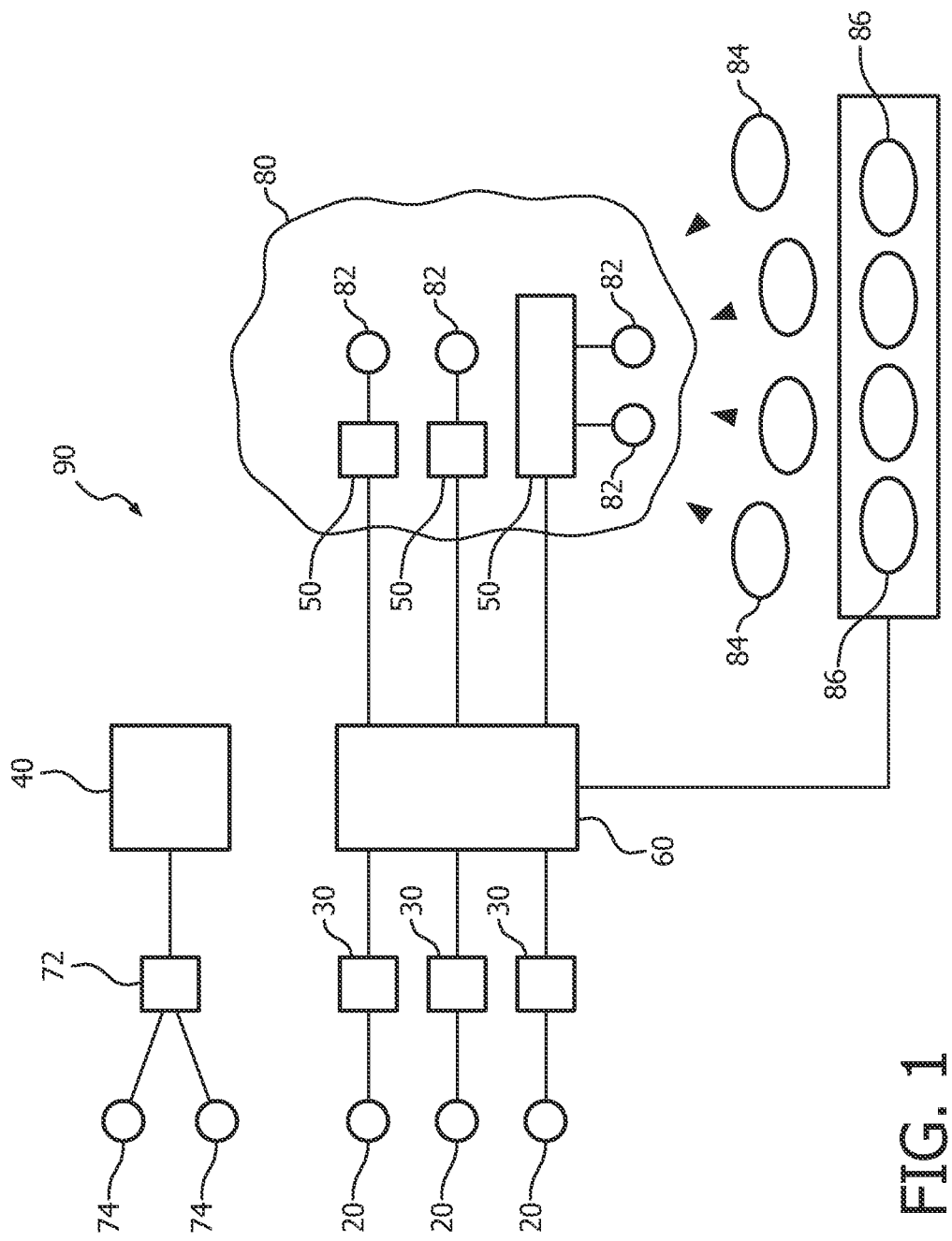
FIG. 1 is a block diagram of an exemplary embodiment of an OLN light change/optimization (LCO) system for an outdoor lighting network in accordance with the invention.

FIG. 1 is a block diagram of an exemplary embodiment of an OLN LCO system for an outdoor lighting network in accordance with the invention. FIG. 1 provides an overview of the OLN LCO system, which enables change and optimization of an outdoor lighting network (OLN). Details for the specific apparatus of the overall OLN LCO system, including the user control apparatus, the central control apparatus, and the lighting unit control apparatus, are provided in FIGS. 3, 4, and 5, respectively.

Referring to FIG. 1, the OLN LCO system 90 in this example includes a number of optional user control apparatus 30; a central control apparatus 40; a number of lighting unit control apparatus 50; and a communication system 60 operably connected between the optional user control apparatus 30, the central control apparatus 40, the lighting unit control apparatus 50. The OLN LCO system 90 can also include lighting units 82, each of the lighting units 82 being associated with one of the lighting unit control apparatus 50. The lighting units 82 of the OLN LCO system 90 illuminate a number of points of interest 84, such as parks, roads, or the like. None, one, or a number of lighting units 82 can be associated with each point of interest 84. Measurement devices 86 can monitor performance of the lighting units 82 at the points of interest 84. The measurement devices 86 can communicate with the central control apparatus 40 over the communication system 60. The measurement devices 86 can be mobile or fixed relative to the lighting units 82. In one embodiment, the measurement devices 86 can be portable devices, such as cell phones, personal portable devices (watches, activity monitors, laptop computers), or the like. The portable devices can be associated with one of the users 20. In another embodiment, the measurement devices 86 can be fixed devices associated with the lighting unit control apparatus 50 or lighting units 82. In yet another embodiment, the measurement devices 86 can be portable devices associated with the optional user control apparatus 30, such as a user control apparatus or a sensing device in a vehicle.

The OLN LCO system 90 can also include one or more telemanagement station 72 in communication with the central control apparatus 40 to allow one or more agents 74 to provide input to the OLN LCO system 90. The agent 74 can be any party providing input to the OLN LCO system 90, such as users, administrators, power suppliers, regulators, or the like. The telemanagement station 72 can be in communication with the central control apparatus 40 directly by being connected to the central control apparatus 40 or can be connected to the central control apparatus 40 through the communication system 60. The users 20 can also be in communication with the central control apparatus 40 through the optional user control apparatus 30.

The OLN LCO system 90 automatically manages changes (e.g., changes in light characteristics, lighting requirements, energy cost/availability, and the like) of light networks and (re)optimizes the operation of a light network for the changes. Each lighting unit 82 registers its settings, operation characteristics, and capabilities with the central control apparatus 40 once the lighting unit 82 is installed and sends the update of its operation characteristics regularly or on-demand (e.g., as characteristics change) to the central control apparatus 40 via the communication system 60. The communication system 60 can use any communication method or protocol available, for example OLN, WiFi, Ethernet, powerline networks, cellular networks, Zigbee, or the like. The central control apparatus 40 can use the light characteristics and capabilities to calculate the illuminance model and cost model for the OLN LCO system 90.

Figure 2:
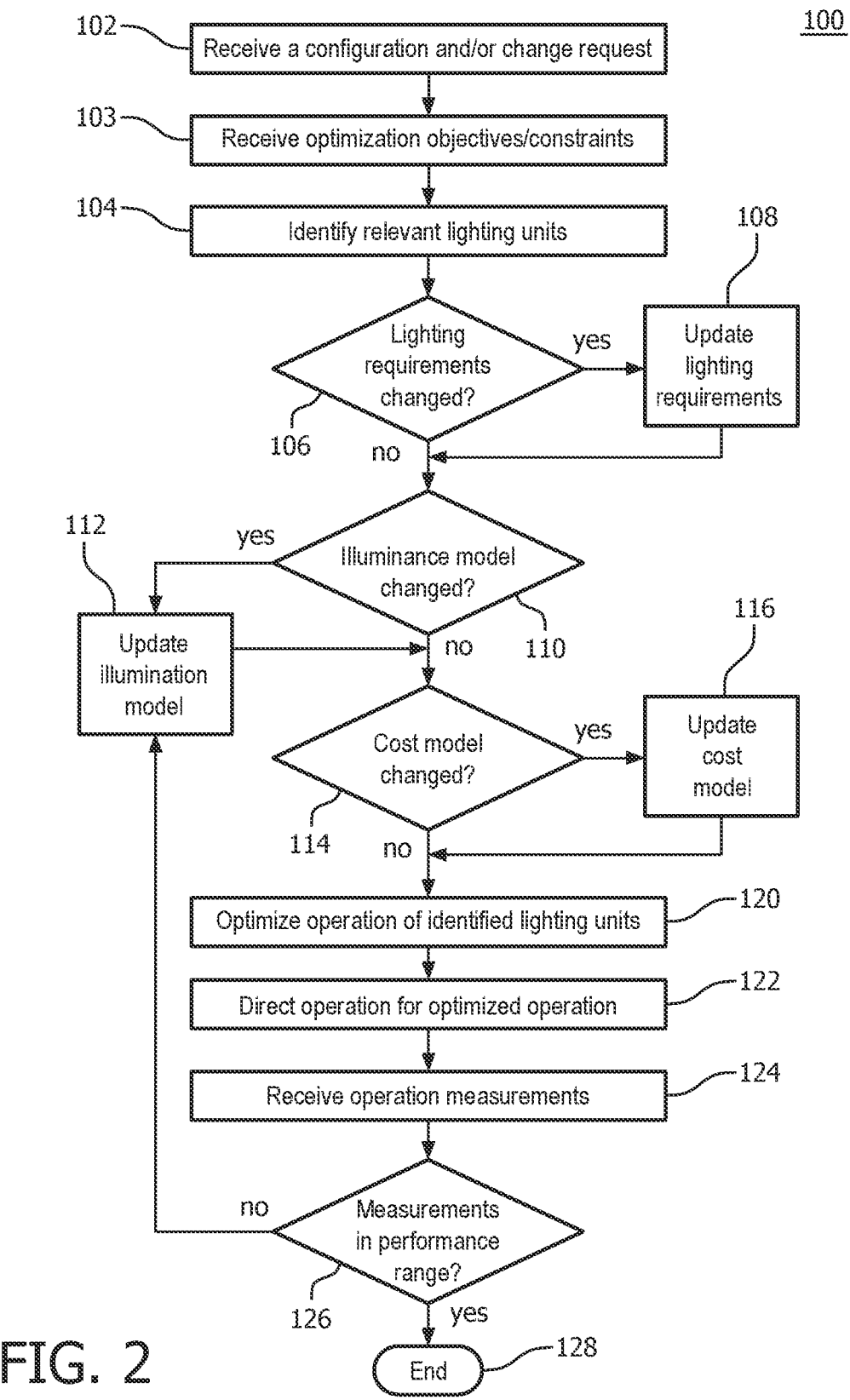
FIG. 2 is a flowchart of a method for light change/optimization for an outdoor lighting network in accordance with the invention.

FIG. 2 is a flowchart of a method for light change/optimization for an outdoor lighting network in accordance with the invention. FIG. 2 provides an overview of the method from the viewpoint of the central control apparatus.

The method 100 includes receiving a configuration request 102; receiving optimization objectives/constraints 103; identifying lighting units associated with the configuration request 104; determining whether at least one of lighting requirements 106, illuminance model 110, and cost model 114 have changed; updating at least one of the lighting requirements 108, the illuminance model 112, and the cost model 116 when at least one of the lighting requirements, the illuminance model, and the cost model have changed; optimizing operation of the identified lighting units as a function of the optimization objectives/constraints, the lighting requirements, the illuminance model, and the cost model 120; and directing the identified lighting units to operate in accordance with the optimized operation 122. The method 100 can optionally include receiving operation measurements for the identified lighting units 124; determining whether the operation measurements are within a desired performance range 126; updating the illuminance model when the operation measurements are not within the desired performance range 112; determining whether the cost model has changed 114; update the cost model when the cost model has changed 116; optimizing operation of the identified lighting units as a function of the optimization objectives/constraints, the lighting requirements, the illuminance model, and the cost model 120; and directing the identified lighting units to operate in accordance with the optimized operation 122. The method 100 can end 128 when the operation measurements are within a desired performance range.

Receiving a configuration request 102 can include receiving and classifying OLN changes, such as changes to lighting unit characteristics, lighting requirements for an area of interest, utility costs (e.g., changes in a demand response signal or dynamic pricing), energy budgeting for an given area/district, environmental conditions, or the like. The receiving a configuration request 102 can be by receipt of a flag or data indicating an OLN change or by detection of an event indicating an OLN change. In one embodiment, the configuration request is an initial configuration request establishing the initial configuration for the OLN system. In one embodiment, the initial configuration is derived from a theoretical/empirical model of light distribution considering location, height, and orientation of the lighting units.

Receiving optimization objectives/constraints 103 can include receiving optimization objectives/constraints that determine how the optimization is to be performed, e.g., minimize total energy cost, maximize lighting uniformity over an area, prefer particular types of available energy sources, or the like.

Identifying lighting units associated with the configuration request 104 can include identifying relevant lighting units affected by the OLN changes. In one embodiment, the relevant lighting units are identified from the location and the coverage of each lighting unit. In one embodiment, lighting units that are too far away from a point of interest (e.g., outside of a given radius from the point of interest) can be disregarded as irrelevant to speed up the optimization calculation.

Determining whether at least one of lighting requirements 106, illuminance model 112, and cost model 114 have changed finds out when parameters affecting OLN operation have changed. Changes can come from agents such as users, regulatory bodies, administrators, power suppliers, environmental sensors, or the like. Updating at least one of the lighting requirements 108, the illuminance model 112, and the cost model 116 when at least one of the lighting requirements, the illuminance model, and the cost model have changed prepares the lighting requirements, illuminance model, and cost model for optimizing operation of the identified lighting units. In one example, a change can be determined by comparing the new parameters with the old parameters used for system configuration and checking if the difference exceeds certain threshold. In another example, a change can be determined by a message/signal received from agents, such as users, regulatory bodies, administrators, operators, or devices in the field (e.g., a sensor in the field).

The lighting requirements can include lighting parameters, such as intensity, uniformity, color temperature, and the like, over an area of interest, such as a street, park, or any other area of interest. The lighting requirements can be selected based on user preferences, regulation requirements, and the like. Changes to the lighting requirements can changes in user preferences, regulation requirements, and/or environmental conditions (e.g., traffic, weather, time of day or night, and the like). In one embodiment, the lighting requirements over an area are represented as the combination of average intensity (illuminance), uniformity, and color temperature. Illuminance and uniformity metrics include percent of grid points illuminated (GPI), average illuminance, coefficient of variation (CV), average-to-min uniformity ratio (AMU), and max-to-min uniformity ratio (MMU). The lighting requirements over the area can be characterized vector of points of interests (POI), e.g., $L=[\ldots l_j, \ldots]^T$ where $l_j$ is the light level (e.g., light intensity and/or color) at a point of interest (POI) j. Examples of vector features include mean, co-variance, max/min, and mean/min. Updating at least one of the lighting requirements 108 includes initializing the lighting requirements vector when the configuration request is an initial configuration and re-characterizing the lighting requirements vector when the lighting requirements change.

The illuminance model relates output of the lighting units to aggregate light performance at a point of interest.

$$A = \begin{bmatrix} \cdots & & \cdots \\ & \cdots & \cdots \\ & \alpha_{ij} & \\ & \cdots & \cdots \\ \cdots & & \cdots \end{bmatrix}$$

is defined as the illuminance model. The aggregate light level $l_j$ for each POI with linear combination of relevant light outputs is given by $l_j=\Sigma_i d_i \alpha_{ij}+a_j$, where $l_j$ is aggregated light level at POI j, $d_i$ is the light output (light intensity and/or color) of lighting unit i, $\alpha_{ij}$ is the contributing factor from lighting unit i to POI j, and $a_j$ is the ambient light level at POI j.

In one embodiment, the illuminance model is characterized by registration of a theoretical/empirical illuminance model of a lighting unit with real space, according to the location/height/orientation/shape of the illuminance of the lighting unit, so that the illuminance model accounts for the terrain of the area of interest with respect to associated lighting units. The model of the lighting unit can be characterized by Illuminating Engineering Society (IES) files. For example, the registration of a theoretical/empirical illuminance model with real space can account for the difference in lighting unit performance on a steep slope versus lighting unit performance on a flat road. In one embodiment, a 3D urban view/planning tool (e.g., Google earth or Bing Map) is combined with the theoretical/empirical illuminance model and lighting unit location/height/orientation/shape information to establish a real 3D light illuminance model for the area of interest (e.g., city street/plaza/landmark). In one example, registration can be performed by first importing a 3D aerial photograph (including topography) of an area of interest from Google Earth into a light calculation tool, such as Dialux via DWG/DXF files. The lighting units (the photometry of which is characterized by IES files) are inserted into the light calculation tool and registered according to a geometry coordination relation. The photometry of a lighting unit describes the way the lighting unit distributes its light into space. Once the lighting units have been inserted and registered, the illuminance and luminance produced by each lighting unit in the area of interest can be calculated.

The cost model determines total cost (e.g., energy and/or operation cost) of the lighting units. Total cost is $C=\Sigma_i \xi_i(d_i(p_i))$, where the cost function $\xi_i$ is the cost as a function of light output of lighting unit i, and the light output function $d_i$ is the light output as a function of input power $p_i$ for lighting unit i. The function $d_i$ is also known as the dimming curve. In one embodiment, the cost function $\xi_i$ can include the energy cost of grid power, the energy cost of renewable/distributed energy sources, operation costs converted from lifetime costs which include the operation cost, and the like.

Optimizing operation of the identified lighting units as a function of the optimization objectives/constraints, the lighting requirements, the illuminance model, and the cost model 120 finds optimal light output combinations to optimize light network operation. For example, optimization can minimize total costs by meeting lighting requirements or optimize lighting performance for given energy cost constraints. In one embodiment, the optimizing searches a database for similar solutions. In another embodiment, the optimizing runs real-time calculations to find a solution. When the cost function $\xi_i$ and the light output function $d_i$ are both linear, the optimizing can solve the linear optimization problem. When the cost function $\xi_i$ and the light output function $d_i$ are both concave, the optimizing can solve the concave/convex optimization problem. Those skilled in the art will appreciate that different solution methods can be used as desired for a particular application.

In one embodiment, the optimizing combines the searchable solution database with the real-time calculations to find a solution. Such a combination can speed up the solution by taking advantage of the fact that similar settings and conditions may occur from time to time, e.g., dimming according to time/traffic/weather, resulting in a similar optimal solution. The searchable solution database is established for a given illuminance model and cost model. When an event or change happens (e.g., weather changes from cloudy to raining, time goes into deep night, traffic varies, or other event), the light manager will automatically identify the light requirements corresponding to the event, and search the searchable solution database for the optimal light output (or input power) for the relevant lighting units by searching similar/matching light requirements.

The optimizing by database/real-time calculation method with a searchable solution table as the searchable solution database includes: populating a searchable solution table with stored lighting requirements $L=[\ldots, l_j, \ldots]^T$, each lighting requirement L having an associated stored optimal input power $P=[\ldots, p_i, \ldots]$ for the stored lighting requirement L; determining present lighting requirements; determining whether the solution table includes a stored lighting requirement to match the present lighting requirements; using the associated stored optimal input power for the matched stored lighting requirement when the stored lighting requirement matches the present lighting requirements; and running a real-time calculation to determine the present optimal input power for the present lighting requirements when the stored lighting requirement do not match the present lighting requirements. In one example, the match between the stored lighting requirement and the present lighting requirements can be determined from the norm of the difference between the new lighting requirements L' and the old lighting requirements L'. If the value of the norm is less than a desired threshold, the stored lighting requirement and the present lighting requirements can be called a match. The searchable solution table can be updated when a new setting or condition occurs. The database/real-time calculation method can also include storing the present lighting requirements in association with the present optimal input power in the searchable solution table after the present optimal input power is determined. Note that changes in the illuminance model or cost model can require new calculations and re-population of the searchable solution table.

Directing the identified lighting units to operate in accordance with the optimized operation 122 adjusts the light output of the identified lighting units. The central control apparatus can send an operation instruction signal to the identified lighting units. Examples of lighting unit adjustments include adjusting input power according to dimming curve, adjusting lighting unit color spectrum (operating frequency), adjusting light direction or light distribution pattern (e.g., tilting an LED panel), or the like.

When desired, the method 100 can optionally include measurement of the operating results and readjustment of lighting unit operation. Such a method can include: receiving operation measurements for the identified lighting units 124; determining whether the operation measurements are within a desired performance range 126; updating the illuminance model when the operation measurements are not within the desired performance range 112. The method 100 can then continue as discussed above by determining whether the cost model has changed 114; updating the cost model when the cost model has changed 116; optimizing operation of the identified lighting units as a function of the optimization objectives/constraints, the lighting requirements, the illuminance model, and the cost model 120; and directing the identified lighting units to operate in accordance with the optimized operation 122.

In one embodiment, the operation measurements for the identified lighting units can be part of an experimental method to establish, correct, and/or update illuminance model values. The experimental method as defined herein includes: identifying inaccurate values in the illuminance model for the identified lighting units; changing light output for at least one of the identified lighting units; measuring light performance at a point of interest as a function of the changed light output; determining a replacement value in the illuminance model from the measured light performance and the changed light output; and storing the replacement value in the illuminance model. The experimental method modifies contributing factors $\alpha_{ij}$ in the illuminance model A. For example, a first measurement of light performance at POI j is taken at a first level of light output of light source i, a second measurement of light performance at POI j is taken at a second level of light output of light source i, and the contributing factor $\alpha_{ij}$ is derived by comparing the difference of light performance at POI j with respect to the difference of the light output of light source i between the first measurement and the second measurement. The experimental method can be repeated as desired for a number of contributing factors $\alpha_{ij}$.

In another embodiment, optimizing operation of the identified lighting units 120 accounts for operation history of the identified lighting units, such as burning hours and/or historical dimming levels. The burning hours are the hours the lighting unit is on, independent of the dimming level. The operation history for each identified lighting unit can be included as a factor in the lighting requirements, the illuminance model, and/or the cost model, and the optimization objectives/constraints selected to achieve a desired operational goal. For example, the optimization objectives/constraints can be selected so that the identified lighting units have the same residual lifetimes by purposely adjusting the burning hour and/or the output of lighting units. In this way, lighting unit maintenance, such as group replacement or re-lamping, can be performed for all the identified lighting units at one time to reduce maintenance costs.

In one example of the method for light change/optimization for an outdoor lighting network, the lighting requirements over an area are changed and the central control apparatus receives such changes. The central control apparatus will walk through the process described in FIG. 2. The optimization objective/constraint is to minimize total energy (Joules) or Cost ($) while meeting the changed lighting requirements. The central control apparatus characterizes the light requirements as L*={ ... $l_j$ ... }, and similarly the input power of lighting units as P={ ... $p_i$ ... }. The central control apparatus needs to find the optimal P (denoted by P*), to meet the new lighting requirement L*, in order to minimize the sum power of P. The central control apparatus searches the searchable solution database for the optimal light output (or input power) combination of relevant lighting units by finding similar/matching light requirements L*. If no matching is found, the central control apparatus carries out a real-time calculation. Following an iterative approach, lighting units will be tested (virtually) one by one to change its power $P_i$ by a fixed $\lambda$ (step size), and the one that approaches most closely to the new lighting requirements will be chosen to update its power by a fixed $\lambda$ in this iteration, while the other lighting units do not change their power. Closeness to the optimal may be defined by a mean-squared measure, $e=\{L^*-L_p\}^2$, where $L_p$ is the projected lighting performance given updated P in this iteration. This process continues, until e is sufficiently small (or zero). The size of $\lambda$ can change from iteration to iteration. The algorithm can be initialized from P=0. This algorithm can also be easily extended to minimize the cost C ($ instead of energy Joules) by replacing the vector P with corresponding vector C={ ... $c_j$ ... }.

Figure 6:
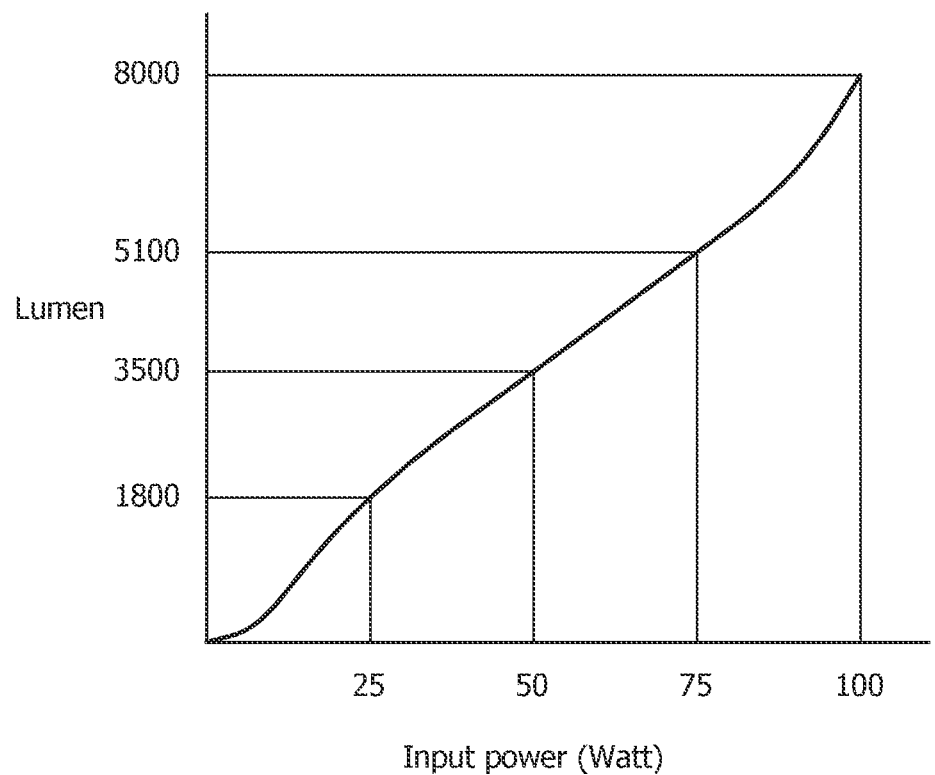
FIG. 6 is a graph of lumens versus input power for an example of a method for light change/optimization for outdoor lighting network in accordance with the invention.

In another example of the method for light change/optimization for an outdoor lighting network, the utility company changes electricity cost ($/kWh) given certain energy demands or changes the limit of the supply of energy for lighting in an area at certain time. The central control apparatus receives a demand response signal from the utility company or demand response agent. Based on the changed electricity cost or the limit of the supply of energy for lighting, the central control apparatus adjusts the power consumption of lighting units to keep total energy consumption/cost below the limit as the optimization objective/constraint (constrained by power supply in emergency situation or by city budget, for example) while optimizing the lighting performance over the area. For a simple example, two lighting units jointly illuminate one area and supposedly have identical lighting distribution (illuminance model) over the area, and a dimming curve as illustrated in FIG. 6. As the input power for these two lighting units as controlled by the outdoor lighting network drops from 200 W to 100 W, the optimal choice would be turning one lighting unit off and let the other lighting unit take the full 100 W, instead of splitting 100 W equally between the two lighting units, i.e., operating each lighting unit at 50 W. As a result, the total light output will be 8000 lumen from the single lighting unit operating at 100 W instead of 7000 lumen from two lighting units operating at 50 W.

Figure 3:
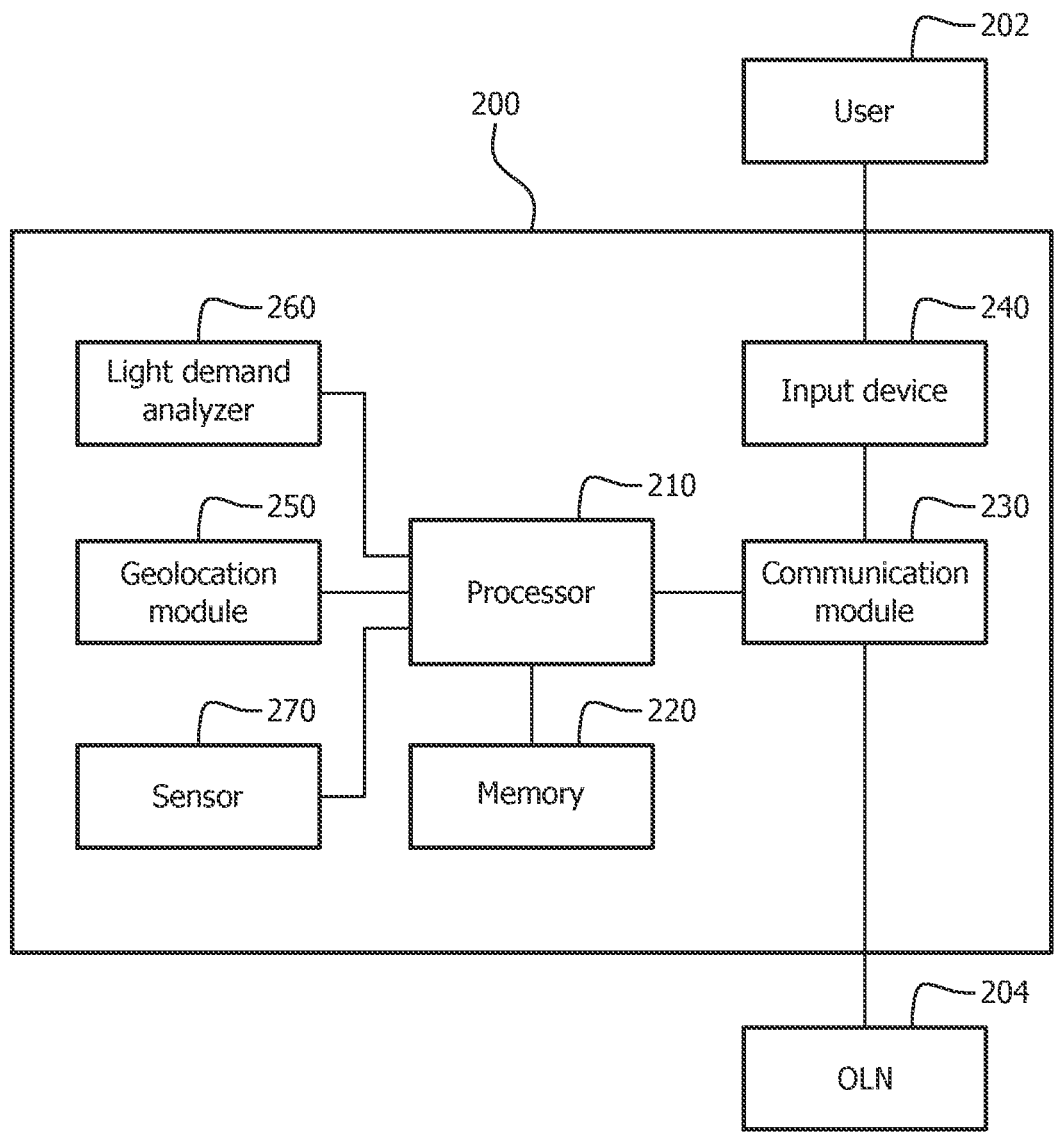
FIG. 3 is a block diagram for an exemplary embodiment of a user control apparatus for an outdoor lighting network in accordance with the invention.

FIG. 3 is a block diagram for an exemplary embodiment of a user control apparatus for an outdoor lighting network in accordance with the invention. As illustrated in FIG. 1, the user control apparatus is accessible to the user and can be used to control the outdoor lighting network through the central control apparatus by providing lighting requirements to the central control apparatus. The user can control the outdoor lighting network to the extent which the user is authorized. The user control apparatus can be implemented as a dedicated device or incorporated in another device. The user control apparatus can be implemented in a mobile phone, PDA, computer (e.g., laptop, tablet such as an iPad), vehicle including a car, airplane, helicopter, boat, or the like, device in a vehicle, mobile GPS device, embedded device, any intelligent device/machine, or any other device accessible to a user. The user control apparatus can also be incorporated in a device which is itself a user, e.g., a security camera which needs different light levels according to the particular situation. In one example, a user control apparatus can operate independently as an autonomous device, and autonomously generate user temporary user policies without human interaction.

The user control apparatus 200 enables a user 202, such as a person or an intelligent device, to control certain features of an outdoor lighting network 204. The user control apparatus 200 also enables a user to discover (or detect) the availability of a user oriented lighting control service at any given location and time. The user control apparatus 200 can be any type of apparatus receiving user input and producing lighting requirements. Examples of lighting requirements include average light intensity, uniformity, color temperature, and/or the like for lighting units over an area, e.g., a street or park, according to factors such as traffic, weather, time of day/night, environment conditions; regulation; user input; or the like.

When the user 202 is an intelligent device, the user control apparatus 200 can automatically generate the lighting requirements. In one embodiment, the intelligent device responds to external stimulus, such as a transponder operating independently of the user control apparatus 200, e.g., receiving/detecting weather and roadway conditions, to initiate the lighting requirements. Another example of this would be a communication device within a vehicle that alerts a local sensor external to the vehicle, and the local sensor provides external stimulus to an intelligent device of the user control apparatus 200, which automatically generates the lighting requirements, e.g., to turn on darkened lighting units when a vehicle approaches. In another embodiment, the user control apparatus 200 can include a means to detect when/where the user lighting control service is available for a given user by combining information received from the OLN with user location information. Once the service availability is detected, the user control apparatus 200 can indicate such availability to the user and enable the user input interface.

The user control apparatus 200 includes a processor 210; a memory 220 operably connected to the processor 210; and a communication module 230 operably connected to the processor 210 for communication between the user 202 and the outdoor lighting network 204. The processor 210 is operable to generate lighting requirements; and transmit the lighting requirements through the communication module 230 to the central control apparatus of the outdoor lighting network.

The communication module 230 can be any type of device that can communicate with the outdoor lighting network 204, such as a ZigBee chip, radio chip with an application layer, application-specific integrated circuit (ASIC), or the like. The communication module 230 can communicate using any desired technology, such as a cellular data communication protocol (e.g., GSM, CDMA, GPRS, EDGE, 3G, LTE, WiMAX), ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like. In one example, the communication module 230 communicates with the outdoor lighting network 204 through a communication system.

The user control apparatus 200 can include an input device 240, such as a keyboard, touch screen, or the like, operably connected to the communication module 230 to allow the user to manually input data, such as user authentication data, area of interest, illuminance requirements, and/or operation schedules. The user 202 can input data individually as desired for a particular application or can input data as a pre-configured request selectable by the user 202 from a number of pre-configured requests.

The user control apparatus 200 can include one or more sensors operably connected to the processor 210. In one embodiment, the sensor can be a geolocation module 250, such as a global positioning system (GPS) receiver, providing the current location, such as GPS coordinates, of the user 202 to the processor 210. In one embodiment, the user control apparatus 200 includes a light demand analyzer 260 operably connected to the processor 210 to determine the area of interest, illuminance requirements, and/or operation schedules from user input, external input, additional sensors, additional processors, combinations thereof, or the like. The user control apparatus 200 can also include a sensor 270, such as an environmental sensor to detect environmental conditions including light level, weather, cloudiness, precipitation, traffic, or the like. The information from the sensor to 70 can be used to formulate the lighting requirements, to measure output from the lighting units, or in other applications as desired for a particular purpose.

The processor 210 can be any type of device that can perform at least one or more of the following: create instructions, execute instructions, and/or process data in accordance with instructions. In one example, the processor is a computer, such as a personal computer, server, or the like. The memory 220 can be any type of memory capable of storing data, programs, and/or instructions. Exemplary memory includes random access memory (RAM), read-only memory (ROM), flash memory, magnetic computer storage devices (e.g. hard disks, floppy discs, and magnetic tape), optical discs, and the like. The memory 220 can be used for long term and/or short term storage.

Figure 4:
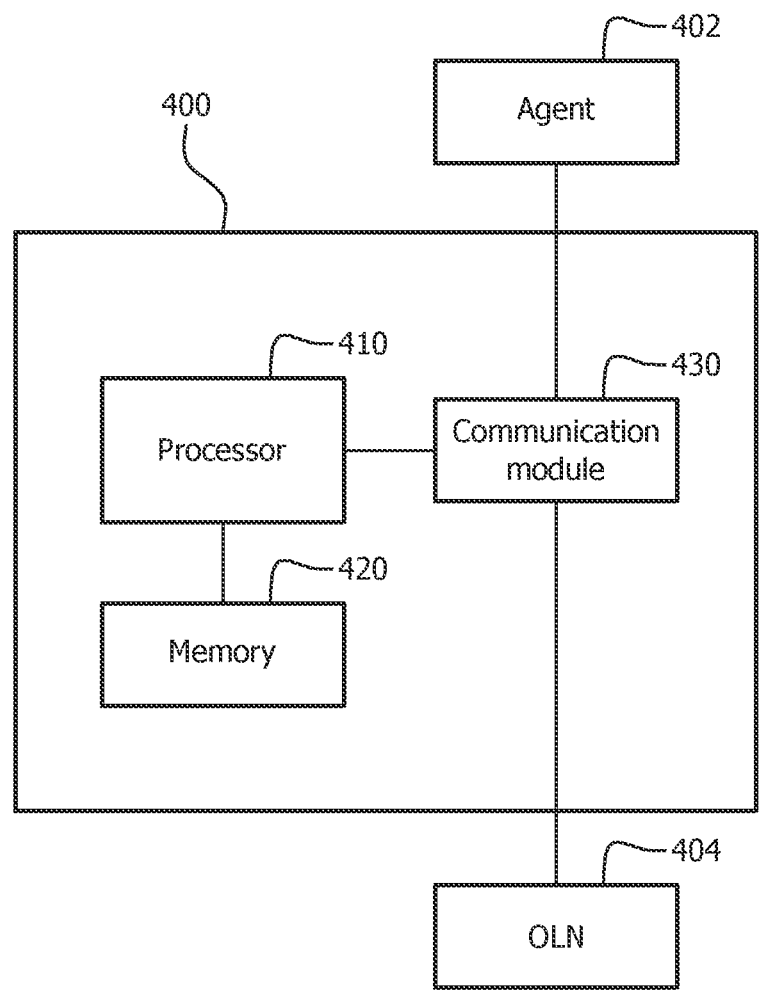
FIG. 4 is a block diagram for an exemplary embodiment of a central control apparatus for an outdoor lighting network in accordance with the invention.

FIG. 4 is a block diagram for an exemplary embodiment of a central control apparatus 400 operatively connected to an outdoor lighting network 404 and an agent 402 in accordance with the invention. The central control apparatus can be implemented in a processor, microprocessor, server, computer, or any other intelligent device with access to the user and the outdoor lighting network. The central control apparatus can be located in a central location or can be distributed over a number of locations.

The central control apparatus 400 enables an operator to change and optimize an outdoor lighting network (OLN). The central control apparatus 400 includes a processor 410; a memory 420 operably connected to the processor 410; and a communication module 430 operably connected to the processor 410 for communication with the agent 402 and the outdoor lighting network 404. The processor 410 is operable to receive a configuration request; receive optimization objectives/constraints; identify lighting units associated with the configuration request; determine whether at least one of lighting requirements, illuminance model, and cost model have changed; update at least one of the lighting requirements, the illuminance model, and the cost model when at least one of the lighting requirements, the illuminance model, and the cost model have changed; optimize operation of the identified lighting units as a function of the optimization objectives/constraints, the lighting requirements, the illuminance model, and the cost model; and direct the identified lighting units to operate in accordance with the optimized operation. In one embodiment, the processor 410 is further operable to coordinate and receive operation measurements for an area of interest; determine whether the operation measurements are within a desired performance range; update the illuminance model when the operation measurements are not within the desired performance range; determine whether the cost model has changed; update the cost model when the cost model has changed; optimize operation of the identified lighting units as a function of the optimization objectives/constraints, the lighting requirements, the illuminance model, and the cost model; and direct the identified lighting units to operate in accordance with the optimized operation.

The memory 420 stores data and commands for managing change and optimization of the outdoor lighting network. The memory 420 can store configuration requests, optimization objectives/constraints, lighting requirements, illuminance model, cost model, and the like. The configuration requests can be received from agents, such as users, administrators, power suppliers, regulators, or the like. The lighting requirements, such as average intensity, uniformity, color temperature, and/or the like, can be received from a user through the user control apparatus, or another agent through a telemanagement station or other device.

The illuminance model, which relates output of the lighting units to aggregate light performance at a point of interest, is generated in the processor 410 and stored in the memory 420. The illuminance model can be calculated theoretically from the lighting unit characteristics, obtained experimentally, or obtained from combinations of theory and experiment. In calculating the illuminance model theoretically, the lighting unit characteristics, such as the location/height/orientation/shape of the illuminance of the lighting unit, can be received from the lighting unit apparatus and stored in the memory 420. In one embodiment, the illuminance model is received by the central control apparatus 400 from the lighting unit apparatus. In another embodiment, the illuminance model is calculated at the central control apparatus 400. The lighting unit apparatus can register the initial lighting unit characteristics with the central control apparatus when the lighting units are installed.

The cost model, which determines total cost (e.g., energy and/or operation cost) from input power to the lighting units, can be calculated from cost information received from an agent such as an energy supplier or utility through a communication system or other device. The memory 420 can also store a searchable solution database of previously calculated optimal solutions, which can be searched to reduce calculation time.

The communication module 430 receives changes from agents and lighting unit apparatus, and coordinates the operation of the lighting units associated with the points of interest involving the changes. The communication module 430 can be any type of device that can communicate with the agent 402 and/or the outdoor lighting network 404, such as a ZigBee chip, radio chip with an application layer, application-specific integrated circuit (ASIC), or the like. The communication module 430 can communicate using any desired technology, such as a cellular data communication protocol (e.g., GSM, CDMA, GPRS, EDGE, 3G, LTE, WiMAX), ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like. In one example, the communication module 430 communicates with the agent 402 and/or the outdoor lighting network 404 through a communication system.

The processor 410 determines how to optimize lighting unit operation. The processor 410 can be any type of device that can perform one or more of the following: create instructions, execute instructions, and/or process data in accordance with instructions. In one example, the processor is a computer, such as a personal computer, server, or the like. The memory 420 can be any type of memory capable of storing data, programs, and/or instructions. Exemplary memory includes random access memory (RAM), read-only memory (ROM), flash memory, magnetic computer storage devices (e.g. hard disks, floppy discs, and magnetic tape), optical discs, and the like. The memory 420 can be used for long term and/or short term storage.

Figure 5:
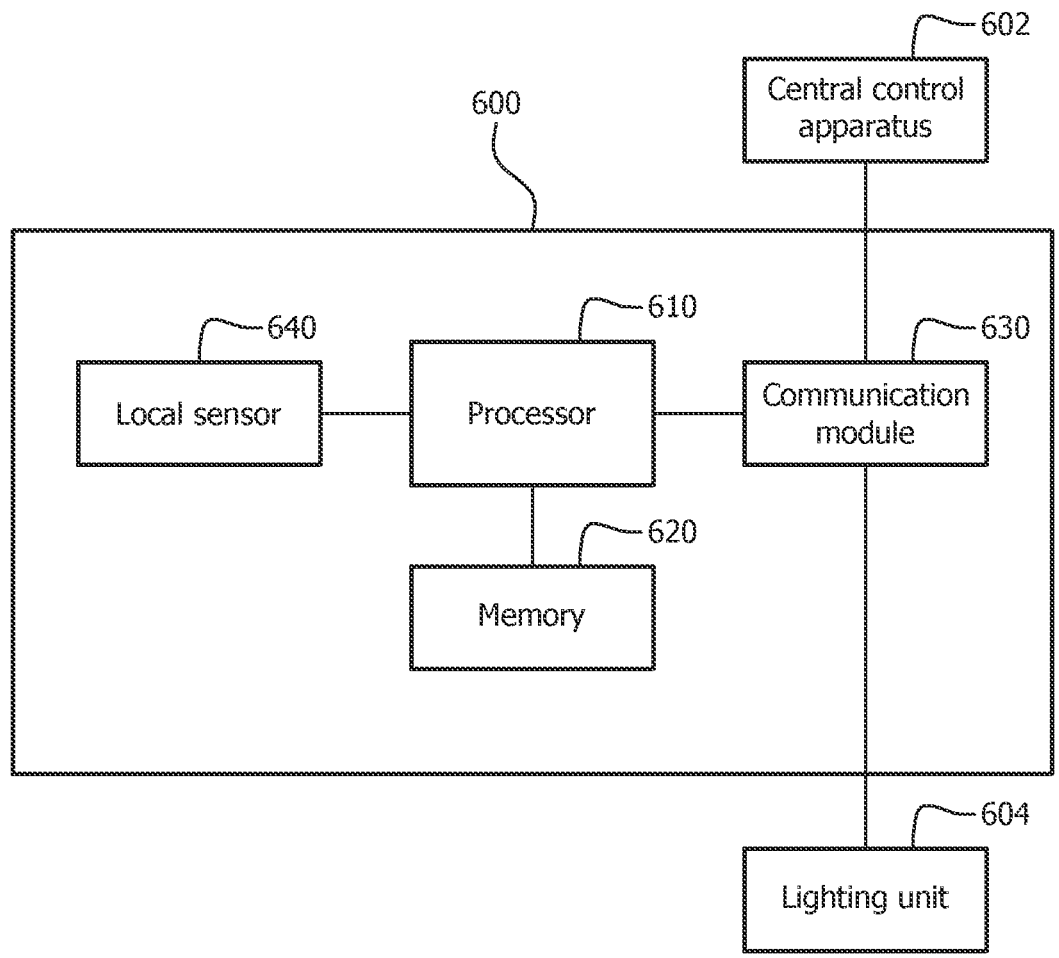
FIG. 5 is a block diagram for an exemplary embodiment of a lighting unit control apparatus for an outdoor lighting network in accordance with the invention.

FIG. 5 is a block diagram for an exemplary embodiment of a lighting unit control apparatus operably connected to a central control apparatus of an outdoor lighting network (OLN) in accordance with the invention. The lighting unit control apparatus can be implemented in a processor, microprocessor, computer, embedded system, or any other electronic device with access to the user and the central control apparatus. The lighting unit control apparatus can be located conveniently in or near the lighting units, such as in a luminaire/fixture, a ballast, an LED driver, an LED panel, a light pole, an associated software/electronics module, or the like. The lighting unit control apparatus can be used to control an individual lighting unit or a group of lighting units.

The lighting unit control apparatus 600 can control operation of associated lighting units in accordance with operation instructions from the central control apparatus. The lighting unit control apparatus 600 includes a processor 610; a memory 620 operably connected to the processor 610; and a communication module 630 operably connected to the processor 610 for communication between the central control apparatus 602 and the lighting unit 604.

The processor 610 is operably connected to the central control apparatus through the communication module 630. The processor 610 is operable to receive operation instructions for controlling operation of the lighting units in coordination with other lighting units to collectively optimize light operation in response to changes over a point of interest. The processor 610 is further operable to provide lighting unit characteristics either initially when the lighting units are installed or after the lighting units are changed after installation. The initial lighting unit characteristics can include the location, height, orientation, light device type, and/or the like for the lighting units. In one embodiment, the initial lighting unit characteristics can also include an illuminance model based on a theoretical/empirical model. The change lighting unit characteristics can include changeable current attributes for the lighting units, such as environmental conditions, dimming curve, burning hours, renewable energy type (e.g., energy available at the lighting unit such as solar, wind, or the like), renewable energy availability (e.g., battery charge, cloudiness, wind speed, or the like).

In one embodiment, the lighting unit control apparatus 600 includes one or more local sensors 640 operably connected to the processor 610. For example, an ambient light sensor can be provided as a local sensor detecting the ambient light level at the lighting unit. Such an ambient light sensor can be used to provide fall-back control when communication to the lighting unit control apparatus is lost, with the lighting unit being turned on when the ambient light sensor detects that it is dark. Other local sensors can include weather sensors, traffic sensors, presence detection sensors, and/or object recognition sensors.

The processor 610 can be any type of device that can perform one or more of the following: create instructions, execute instructions, and/or process data in accordance with instructions. In one example, the processor is a computer, such as a personal computer, server, or the like. The memory 620 can be any type of memory capable of storing data, programs, and/or instructions. Exemplary memory includes random access memory (RAM), read-only memory (ROM), flash memory, magnetic computer storage devices (e.g. hard disks, floppy discs, and magnetic tape), optical discs, and the like. The memory 620 can be used for long term and/or short term storage.

The communication module 630 can be any type of device that can communicate with the central control apparatus 602 and/or the lighting unit 604, such as a ZigBee chip, radio chip with an application layer, application-specific integrated circuit (ASIC), or the like. The communication module 630 can communicate using any desired technology, such as a cellular data communication protocol (e.g., GSM, CDMA, GPRS, EDGE, 3G, LTE, WiMAX), ZigBee protocol operating on top of the IEEE 802.15.4 wireless standard, WiFi protocol under IEEE standard 802.11 (such as 802.11b/g/n), Bluetooth protocol, Bluetooth Low Energy protocol, or the like. In one example, the communication module 630 communicates with the central control apparatus 602 and/or the lighting unit 604 through a communication system.

Figure 7:
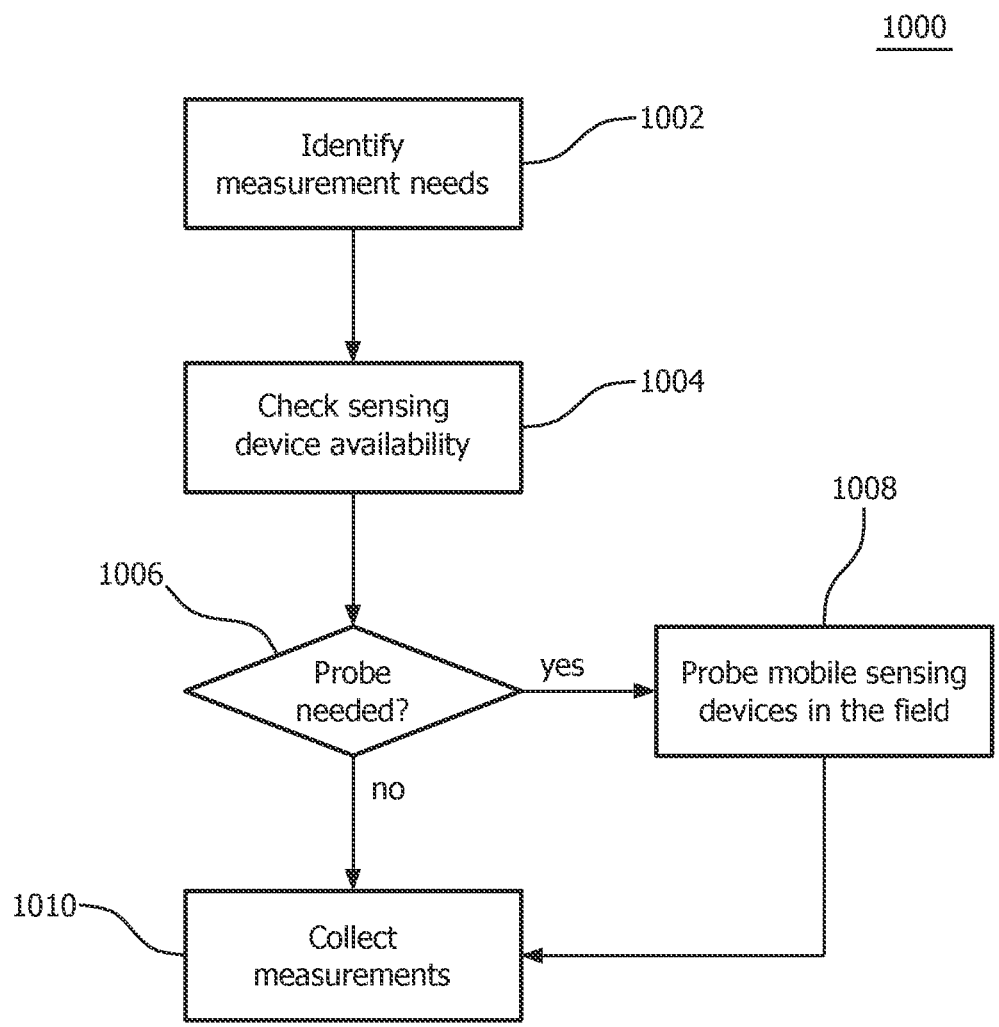
FIG. 7 is a basic flowchart of a method for coordinating lighting measurements for light chain/optimization for an outdoor lighting network in accordance with the invention.

FIG. 7 is a basic flowchart of a method for coordinating lighting measurements for light change/optimization for an outdoor lighting network in accordance with the invention. The method 1000 includes identifying measurement needs 1002; checking sensing device availability 1004; determining whether a probe is needed 1006; and collecting measurements 1010 when a probe is not needed 1006. The method 1000 can also include probing mobile sensing devices in the field 1008 when a probe is needed 1006; and collecting measurements 1010.

The method 1000 can provide operation measurements for lighting units from mobile sensing devices, such as discussed for FIG. 2 for operation measurements that can be used to determine at the lighting units are operating within a desired performance range 126. As such, the central control apparatus can be operable to identify measurement needs for identified lighting units; check mobile sensing device availability for the identified lighting units; determine whether a probe is needed in light of the mobile sensing device availability; probe for available mobile sensing devices when the probe is needed; and collect the operation measurements from the available mobile sensing devices.

The mobile sensing devices can be any personal/mobile/vehicle device, such as a cell phone, computer, activity monitor, watch, car unit, or the like, with at least a light sensor and the capability to communicate (directly or indirectly) with the central control apparatus. The mobile sensing devices can be measurement devices 86 as illustrated in FIG. 1, or a sensor 270 in a user control apparatus 200 as illustrated in FIG. 3. The mobile sensing devices can communicate directly with the central control apparatus 40 over a communication system 60 as illustrated in FIG. 1, or indirectly through the lighting unit control apparatus 50 or other communication system. Direct communication can be performed by radiofrequency, visual light communication, and/or other transport medium (wired or wireless). Indirect communication can be performed through a third party network infrastructure, such as a cellular network.

Referring to FIG. 7, identifying measurement needs 1002 can include identifying measurement needs for an area of interest. Measurements can be coordinated through measurement windows. A measurement window is associated with an area of interest (AOI). The definition format of the measurement window can include AOI identification, measurement period specification, report mode, and measurement type. In one embodiment, the area of interest for which measurement needs are identified can be the same as the area of interest for which operation measurements are received. In another embodiment, the area of interest for which measurement needs are identified can be different from the area of interest for which operation measurements are received.

The AOI identification can include the geographical area in the measurement grid such as specific measurement locations, points of interest, or the like.

The measurement period specification can include the time window for measurements and the repetition pattern such as when the measurement is to be taken a single time within the AOI or at specific times and/or locations within the AOI. When no time window is specified, the measurement can be triggered by entering the particular location or AOI.

In one embodiment, the repetition pattern includes a series of points of interest (POI), a series of time instants, or a combination of both points of interest and time instants. The repetition pattern can indicate how the mobile sensing device performs measurements. In one example, the mobile sensing device can measure the POIs in a predefined order (e.g. order in which POIs appear in the AOI specification). In another example, the mobile sensing device can measure the POIs randomly, one after another, and the measurement report sent to the central control apparatus can include information on the order in which the measurements were taken or identify the specific location of each measurement.

When the POIs are measured randomly, mobile sensing devices can follow their own path: moving in and out of an AOI or moving around within an AOI like a pedestrian or a car, instead of performing measurements at predefined POIs. The mobile sensing devices can measure the light performance at multiple time instants as they move in, out of, or around within AOI. The measurement reports can include the relative location to the lighting units (distance to, towards or away from) as well as a time stamp for the measurement. The sequence of measurements allows the central control apparatus to identify the light performance at different places and time instants within an AOI. The sequence can also be used to indicate the reliability and categorize measurements analytically as either good measurements or bad measurements. In one embodiment, a confidence interval for a certain measurement can be used to discard redundant measurements that fall outside of an expected interval. Good measurements can be used to calculate the light performance, and bad ones can be discarded.

The requested measurements can also include unique characteristics of lighting units, such as a unique light pattern or identification code transmitted from the lighting unit. Detection of unique characteristics of lighting units by mobile sensing devices can be used by the central control apparatus to monitor operational status of the lighting unit and to identify contributions from multiple lighting units at a given location (e.g., a sensor may detect and report unique codes/patterns from multiple lighting units at a certain location).

The requested measurements can also include a combination of multiple measurements and conditions that characterize a certain event. For example, an event could consist of a combination of light intensity at certain time within a given AOI.

The report mode specifies how the measurement is to be reported, and can be a priority report mode which reports a given time after entering AOI or receiving a measurement request; a best effort mode which reports on a first upload opportunity; a scheduled mode which reports a specific time and/or location, such as when a mobile sensor arrives at a particular location at a particular time; or a report on event mode which reports when a certain event is detected.

The measurement type specifies additional information about the measurement, and can include a type array which specifies the type of requested measurements; a capability type specifies the expected capabilities/conditions under which each measurement type is to be performed (e.g., precision, range, thresholds, sensor height above ground, or the like); and a format array which specifies the format under which each measurement type is to be reported (e.g., illuminance, color, numeric formats for directional lighting measurements, and the like).

The type of measurements may include any specific light performance measurements, such as intensity/illuminance, color temperature, direction, and the like. A combination of these light measurements can give the central control apparatus detailed information about the lighting performance over an AOI. For example, measurements can indicate when there is too much light for drivers when facing the intersection, and too little light when leaving the intersection. Using a directional measurement can also help separate light contributions from different sources, for example, light from the lighting units versus light from car head lights.

The method 1000 also includes checking mobile sensing device availability 1004 for the area of interest once a measurement need is identified 1002. The central control apparatus can check for available mobile sensing devices to carry out the measurements according to the specific needs identified. In one embodiment, the central control apparatus can consult a location database service that stores the current or most recent locations of registered user mobile sensing devices that can operate as capable mobile sensing devices. When a capable mobile sensing device is identified, the central control apparatus can request a measurement from the selected mobile sensing device 1010. When multiple capable mobile sensing devices are identified, the central control apparatus can also request measurements from a selected group of the identified multiple mobile sensing devices.

In one embodiment, the central control apparatus can select mobile sensing devices for a particular measurement window based on a combination of the following: current location of the mobile sensing devices (i.e., whether the mobile sensing device is within the AOI); the expected/estimated location of the device relative to the AOI within the time span of the measurement window (i.e., whether the mobile sensing device is expected to enter the AOI within the expected measurement time window); and the capabilities of the mobile sensing device to perform the measurement under certain conditions (e.g., sensor type, sensor measurement precision, sensor height). For example, when the central control apparatus needs a measurement from an AOI which is an intersection between roadways, the central control apparatus can select mobile sensing devices which are currently stationary within the AOI or can select mobile sensing devices (e.g., in vehicles) traveling in the direction of the AOI. The central control apparatus can also select a mobile sensing device from a set of specialty devices (e.g., maintenance vehicles) with a pre-defined route that would include the AOI.

The method 1000 also includes determining whether a probe is needed 1006. When mobile sensing devices that are available do not have the required capabilities (e.g., type, precision, height, or the like) or when information about mobile sensing devices is not available, the central control apparatus can probe for capable mobile sensing devices in the field 1008 by sending probe messages into the AOI. The probing 1008 can include collecting responses and reconfiguring the measurement window. Once available mobile sensing devices have been identified, with or without a probe, measurements can be requested and collected 1010. The collection of measurements can include transmitting new measurement requests (MREQs) and/or reconfiguring any active measurement windows as needed. In one embodiment, the measurement request can guide the movement of mobile sensing devices to perform a targeted measurement over an AOI. The method 1000 can also include transmitting reports, such as measurement reports, from the mobile sensing devices and/or receiving the reports at the central control apparatus.

Figure 8:
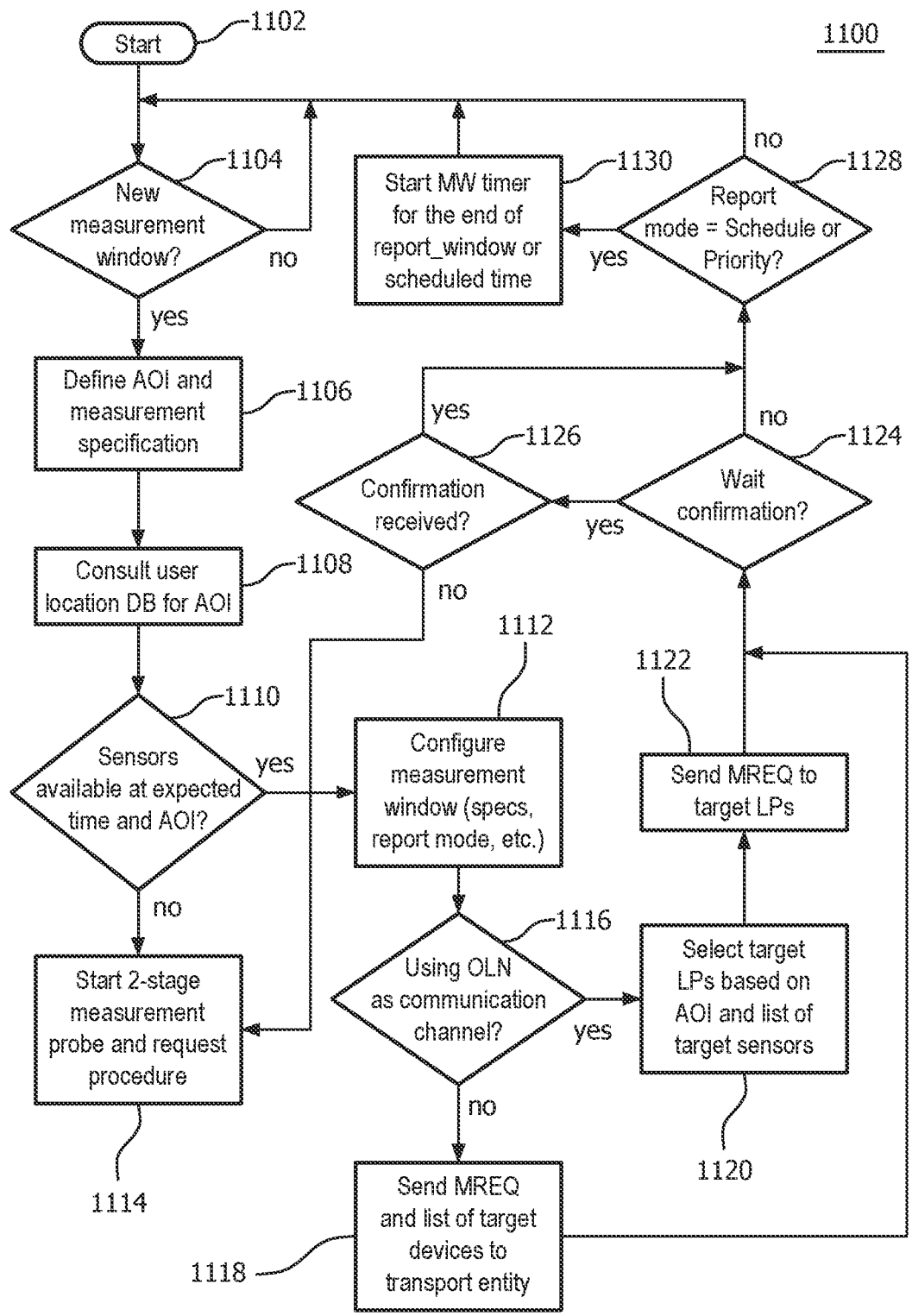
FIG. 8 is a detailed flowchart of a method for coordinating lighting measurements for light chain/optimization for an outdoor lighting network in accordance with the invention.

FIG. 8 is a detailed flowchart of a method for coordinating lighting measurements for light change/optimization for an outdoor lighting network in accordance with the invention. In this example, the central control apparatus obtains measurements for a specific measurement window. The central control apparatus can coordinate measurements to meet specific needs, for example, the mobile sensing devices can independently perform and report measurements, or the mobile sensing devices can acquire measurements on demand. While collecting measurements, the central control apparatus can decide to close a measurement window before its original closing time. For instance, the central control apparatus can send a Measurement Stop (MSTOP) message when enough measurements are collected for a given measurement window.

The mobile sensing devices perform measurements associated with specific measurement windows and report the measurement results to the central control apparatus according to a predetermined report mode and format. The mobile sensing device can configure a measurement window in response to a specific probe and measurement request (MREQ) from the central control apparatus, but the mobile sensing device can also have pre-configured measurement windows, which can be defined during registration, calibration or manufacturing. In one embodiment, the mobile sensing device has multiple pre-configured measurement windows. In one example, selected vehicles (e.g., buses and taxis) can have pre-configured measurement windows for an AOI and/or time, such as a preconfigured measurement window for light measurements from lighting units along a certain street/route. The mobile sensing device can report the measurement results at the end of the route or at a specific time. In another embodiment, the mobile sensing devices can have a measurement window configured to detect faulty light units, e.g., lighting units which are on during the day or lighting units which are off during certain hours at night. In this case, the AOI can be a residential/community area and the measurement type can be the light intensity and identification from each lighting unit, e.g., the lighting unit can transmit a unique lighting unit ID using coded light, an RF link, or other communication channels.

The method 1100 starts 1102 and determines whether there is a new measurement window 1104. When there is no new measurement window 1104, the method 1100 returns to the start. When there is a new measurement window 1104, the method 1100 continues with defining an AOI and measurement specification 1106; consulting a user location database for the AOI 1108; and determining whether sensors are available at an expected time and in the AOI 1110. When sensors are not available 1110, the method 1100 starts a two-stage measurement probe and request procedure 1114. When sensors are available 1110, the method 1100 continues with configuring the measurements window and determining whether the outdoor lighting network is to be used as a communication channel 1116. When the outdoor lighting network is to be used as a communication channel 1116, the method 1100 continues with selecting target lighting points/units based on the AOI and a list of target sensors 1120; then sending a measurement request to the target sensors through the OLN 1122. When the outdoor lighting network is not to be used as the communication channel 1116, the method 1100 continues with sending a measurement request and a list of target mobile sensing devices to an alternate communication channel 1118.

The method 1100 continues with determining whether the measurement performance is to await confirmation 1124. When the measurement performance is to await confirmation 1124, the method 1100 continues with determining whether confirmation is received 1126. When the confirmation is not received 1126, the method 1100 returns to a two-stage measurement probe and request procedure 1114. When the measurement performance is not to await confirmation 1124, or the measurement performance is to await confirmation 1124 and confirmation is received 1126, the method 1100 continues with determining whether the report mode is equal to the desired schedule or priority 1128. When the report mode is equal to the desired schedule or priority 1128, the method 1100 continues with starting a measurement window timer for the end of the report window or scheduled time 1130 and returning to the start 1102. When the report mode is not equal to the desired schedule or priority 1128, the method 1100 returns to the start 1102.

Figure 9:
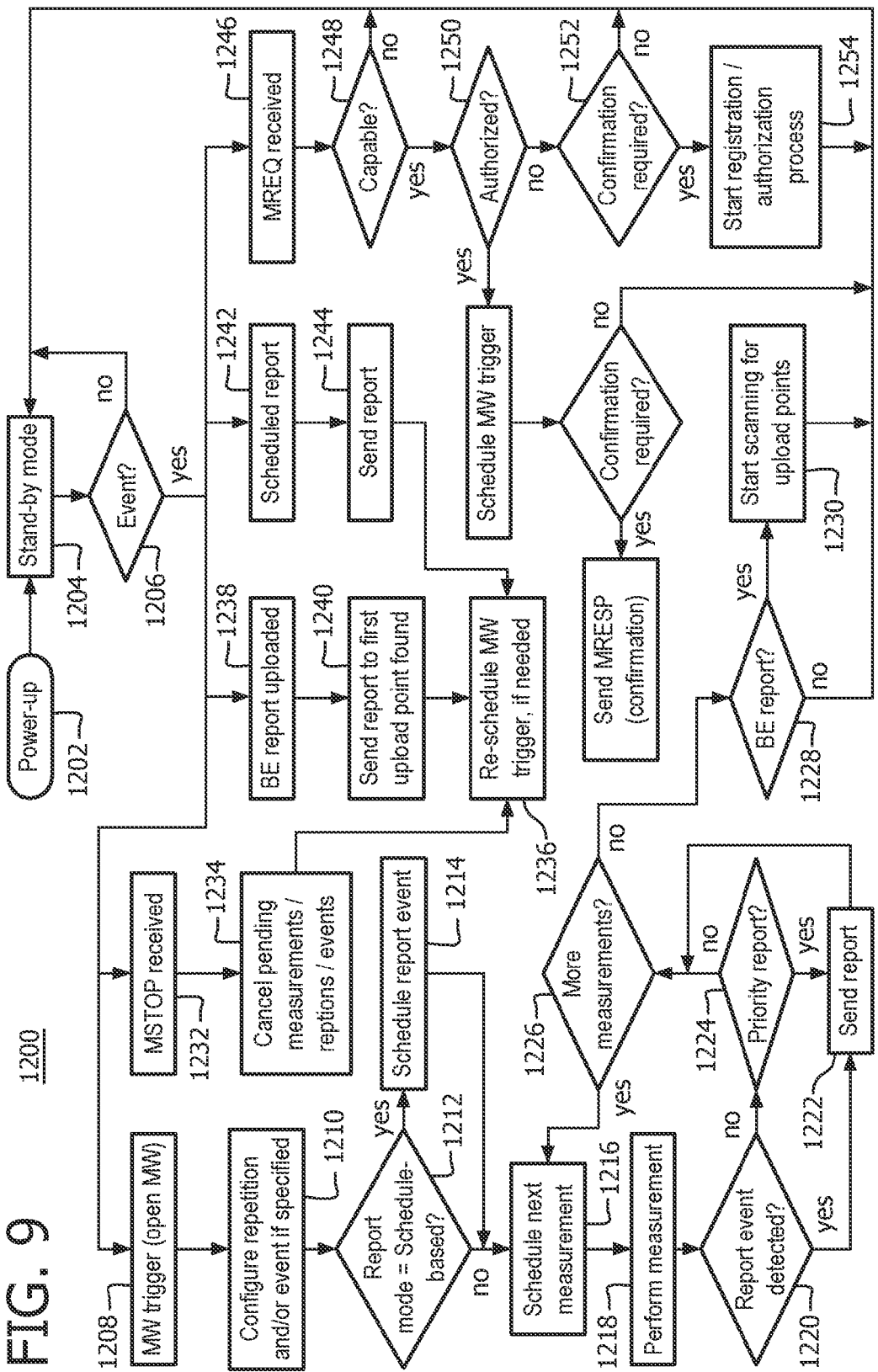
FIG. 9 is a flowchart of a method for coordinating lighting measurements using mobile sensing devices for light chain/optimization for an outdoor lighting network in accordance with the invention.

FIG. 9 is a flowchart of a method for coordinating lighting measurements using mobile sensing devices for light change/optimization for an outdoor lighting network in accordance with the invention. In this example, the sensor performs measurements for a given measurement window, reacts to specific commands, configures new measurement windows, and/or reports measurement. FIG. 9 provides an overview of the method from the viewpoint of the mobile sensing device.

The mobile sensing device can independently perform the measurements for pre-configured measurement windows and report the results as specified. The mobile sensing device can perform measurements for a given measurement window, react to specific commands from the central control apparatus, configure new measurement windows, and report the measurements. When reporting measurements, a mobile sensing device can include the following in the measurement report: a measurement array where each unit is the result of a given measurement type and follows a specific format as requested by the central control apparatus; the location and time for every measurement unit can be included depending on the report mode or when required by the central control apparatus; a measurement condition array in which for each unit in the measurement array the mobile sensing device can optionally indicate the specific parameters used in the measurement (e.g., the measurement precision, height, direction, relative position with respect to a lighting unit, precision of the location and time information reported, and the like); and an identifier for the mobile sensing device, preferably unique, which follows a specific format known the central control apparatus, such as a specific number, string, or code. The location and time can be included in any Best Effort report in which the mobile sensing device adds location and time for each measurement reported; a Priority report in which no location and time are needed, but when the report_window is small, but central control apparatus can explicitly request location and time; or a Scheduled report in which optional location and time as information can be pre-configured.

In addition to performing and reporting measurements, the mobile sensing devices can also identify relevant context information associated with a measurement. The device can use this information locally or can transfer such information to the central control apparatus. When location and time are not included in the measurement report, the central control apparatus can estimate location and time based on how the central control apparatus received the measurement report (e.g., through a given lighting unit) and context information provided by the mobile sensing device. In one example, when a mobile sensing device detects that it is currently unable to carry out a specific measurement due to its position (e.g., a light sensor is covered due to placement), the mobile sensing device cannot respond to a new probe from the central control apparatus, nor can it indicate that a scheduled measurement was not performed due to impediments, nor can it request support from the user in order to carry on with a measurement (e.g., request that the user place the mobile sensing device at a certain location).

The context information can include any useful information to calibrate the measurements or to check the reliability and validity of the measurements. For example, a mobile sensing device can include accelerometers in addition to light sensors. The accelerometers indicate the 3D position of the mobile sensing device in the space, e.g., the light sensors face up, down, south, or west. A mobile sensing device can include specialized light sensors designed for light performance measurements and can also include light sensors for other purposes, such as sensors used to adjust the screen brightness of mobile handheld devices, such as cell phones or the like. The light sensors can sometimes be blocked or partially blocked from one or multiple light sources by objects (e.g., a person's body). This can also happen when sensors are moving. In one embodiment, the user can explicitly indicate the situation through the mobile sensing device. In another embodiment, the situation can be derived from context information, such as combining measurements from different types of light sensors, sudden change in measurements, motion towards light sources or away from light sources, the relative position of the mobile sensing device which carries the light sensors, or the like.

Referring to FIG. 9, the method 1200 begins with power up 1202 and continues by entering a standby mode 1204. The method 1200 determines whether there is an event 1206. When there is no event 1206, the method 1200 returns to the standby mode 1204. When there is an event 1206, the event can be a measurement window trigger event 1208, a measurement stop command event 1232, a best effort report upload command event 1238, a schedule report command event 1242, or a measurement request command event 1246.

For the measurement window trigger event 1208, the method 1200 continues with configuring the repetition and/or measurement window trigger as specified 1210, and determining whether the report mode is scheduled based 1212. When the report mode is scheduled based 1212, the report event is scheduled 1214, and the method 1200 continues with scheduling the next measurement 1216. When the report mode is not scheduled based 1212, the method 1200 continues with scheduling the next measurement 1216. The method 1200 then continues with performing the measurement 1218 and determining whether a report event is detected 1220. When a report event is detected 1220, the report is sent 1222. When a report event is not detected 1220, it is determined whether the report is a priority report 1224 and the report is sent 1222 when the report is a priority report. When the report is not a priority report 1224 or the report has been sent 1222, it is determined whether more measurements are required 1226. When more measurements are required 1226, the method 1200 returns to scheduling the next measurement 1216. When more measurements are not required 1226, the method 1200 continues with determining whether the report is a best effort report 1228. When the report is a best effort report 1228, the method 1200 continues with starting the scanning for upload points 1230 and returns to the standby mode 1204. When the report is not a best effort report 1228, the method 1200 continues with returning to the standby mode 1204.

For the measurement stop command event 1232, the method 1200 continues with canceling pending measurements, repetitions, and/or events 1234, and rescheduling measurement window trigger events as required 1236.

For the best effort report upload command event 1238, the method 1200 continues with sending the best efforts report to the first upload point found 1240, and rescheduling measurement window trigger events as required 1236.

For the schedule report command event 1242, the method 1200 continues with sending the report 1244, and rescheduling measurement window trigger events as required 1236.

For the measurement request command event 1246, the method 1200 continues with determining whether the sensor is capable of performing the measurement 1248. When the sensor is not capable of performing the measurement 1248, the method 1200 continues with returning to the standby mode 1204. When the sensor is capable of performing the measurement 1248, the method 1200 continues with determining whether the measurement is authorized 1250. When the measurement is authorized 1250, the method 1200 continues with scheduling a measurement window trigger event 1256, and determining whether confirmation is required 1258. When confirmation is required 1258, the method 1200 continues with sending a measurement response 1260. When confirmation is not required 1258, the method 1200 continues with returning to the standby mode 1204. When the measurement is not authorized, the method 1200 continues with determining whether confirmation is required 1252, starting a registration/authorization process 1254 when confirmation is required 1252, and returning to the standby mode 1204. When confirmation is not required 1252, the method 1200 continues with returning to the standby mode 1204.

While the benefits from gathering light and other contextual information are many, there can be a concern about privacy. The stored information, such as past context and future schedules, can be used maliciously. The information uniquely associated with the available mobile sensing devices can be de-identified or anonymized to avoid misuse. In one embodiment, the stored information can be stored anonymously. The central control apparatus applies a hash function to all the information that is uniquely associated with a mobile sensing device, such as the identifier used in the measurement report, before storing the information. All stored information pertinent to the mobile sensing device is tagged based on the hashed value. The unique device identifier can be a name string, an email address, a MAC address, or the like. The unique device identifier cannot be retrieved from the hash value even if the central control apparatus database's security is compromised, so information regarding mobile sensing device remains anonymous. When the central control apparatus receives information from a sensor, it can perform the same hash function on the identifier and retrieve information tagged for this mobile sensing device. Hash functions such as those used in security systems can be used to implement such anonymous storage. Those skilled in the art will appreciate that any method can be used to de-identify the information uniquely associated with the available mobile sensing devices as desired for a particular application.

In one embodiment, the method of operation of the mobile sensing device, such as the method described in FIG. 9, can be implemented as a software module which can be downloaded and installed by the users (e.g., as an application downloadable from any source of downloadable software or applications). For some mobile sensing devices, such a software module can be pre-installed at the time of manufacturing. The software module can also include an interface for users to enter personal information (e.g., identity, settings, preferences, address, etc.) which can be used to configure default measurement windows (e.g., measurement windows for monitoring community street lights). The software module can communicate (directly or indirectly) with the central control apparatus in order to register the mobile sensing device. In one embodiment, the mobile sensing device is operable to allow the user to register the mobile sensing device with the central control apparatus. A user can register their mobile device with the central control apparatus to operate as a mobile sensing device under the coordination of the central control apparatus. When sensor calibration is needed, the same software module can execute a calibration procedure which can request input from the user.

Calibration procedures can be performed to calibrate the light sensors in the mobile sensing devices. In one embodiment, the calibration procedure includes an assessment period, during which the mobile sensing device executes specific measurements under the control of the central control apparatus (e.g., at specific locations and time) and reports the results. The specific measurements can be specific measurements for a selected lighting unit. The central control apparatus analyzes the results, then confirms the calibration or requests more measurements as needed. During calibration, the software module at the user's mobile sensing device can request the users to follow certain steps to facilitate calibration (e.g., request the user to place the mobile sensing device at specific locations and/or positions).

In one embodiment of the calibration method, a user of a mobile sensing device is requested to place the mobile sensing device at a selected position having a known lighting value in order to perform measurements. One or more lighting measurements are performed with the mobile sensing device. The lighting measurements can be used to calibrate the mobile sensing device against the known lighting value. The calibration can be done locally at the mobile sensing device by an algorithm that compares the lighting measurements with reference measurements. Alternatively, the measurements can be transmitted to the central control apparatus, which can perform the calibration. In one example, the known lighting value is obtained from a reference light sensor. The reference light sensor can be associated with a particular lighting unit, and the user of the available mobile sensing device can be requested to place the mobile sensing device at the particular lighting unit. In another example, the known lighting value is obtained from a pre-calibrated mobile sensing device.

In another embodiment of the calibration method, a user of an available mobile sensing devices is requested to locate the mobile sensing device in an area of interest. A lighting measurement is performed with the mobile sensing device and another lighting measurement performed with a reference light sensor. The difference between the lighting measurements is determined, and the mobile sensing device is calibrated to the lighting measurement from the reference light sensor when the difference exceeds a predetermined value. In one example, the reference light sensor is associated with a particular lighting unit, and the user is requested to locate the mobile sensing device at the particular lighting unit and the second area of interest.

In another embodiment of the calibration method, the user can be asked to take the mobile sensing device to the base of a lightning unit and press a button. The lighting unit can have another reference light sensor collocated with the likely placement of the users' mobile sensing device that takes a measurement for the lighting unit. The two measurements are then used to calibrate the user's sensor in the mobile sensing device. Alternatively, when the reference sensor is not connected to the network but provide the display of its light reading, the user can be asked to enter the displayed reference sensor reading on the mobile device to complete the calibration process. The light conditions under a lightning unit are expected to change dramatically due to various reasons, including time of the day or night, reflections from near-by objects such as cars and trucks, blockage of light due to foliage or dirt, or the like. In the absence of a reference light sensor nearby, other previously calibrated mobile sensors in the vicinity of the user's lights sensor can serve the function of the reference sensor. For instance, the central control apparatus can select other similarly calibrated sensors that have performed or are able to perform measurements under similar conditions as the new light sensor in the mobile sensing device to be calibrated. The central control apparatus can select similarly calibrated sensors on the basis of such parameters as location, time, capabilities, and the like. Once the reference and new light sensor measurements are collected, the central control apparatus can compare the values and indicate any adjustment needed for the new light sensor. The adjustment can be communicated from the central control apparatus to the mobile sensing device using an available communication channel.

Incentives can be provided so that users receive direct or indirect benefits from registering mobile sensing devices with the central control apparatus, and performing and reporting measurements as requested by the central control apparatus. In one embodiment, users can receive benefits as part of a community, benefits such as better lighting conditions adaptable to weather/traffic/presence, less lighting pollution, and less trespass in an area of interest. In another embodiment, a user can receive a direct personal benefit from the central control apparatus in the form of credits (e.g., money, points, or similar real or virtual units) that can be exchanged for access to a service provided by the outdoor lighting network by a third party associated to the central control apparatus. In one example, users could accumulate credits (points) as their mobile sensing devices perform and report measurements in response to central control apparatus requests. Such credits could be exchanged for access to a personalized lighting control service, in which the user could control operation of lighting units in a given selected AOI within certain constraints. In another example, the user could exchange credits for access to environmental and energy monitoring information for their community provided by the central control apparatus. In yet another example, the users could exchange accumulated credits for access to a power charging service provided by the outdoor lighting network, in which user's electrical devices could receive power from lighting units or other charging devices connected to the outdoor lighting network.

Those skilled in the art will appreciate that the outdoor lighting network control system is not limited to lighting management and public safety applications, but can be used aesthetically for beautification and entertainment. In one example, the lighting units can change brightness, color, and direction throughout the day and evening to light areas of a city to the best effect. In another example, the brightness, color, direction, and flashing state of the lighting units can be changed as an artistic display. In yet another example, the brightness, color, direction, and flashing state of the lighting units can be changed as an artistic display synchronized with a public performance such as music, fireworks, or the like.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for managing an outdoor lighting network (OLN) having a plurality of lighting units, the system comprising:
a central control apparatus;
at least one lighting unit control apparatus; and
a communication system operably connecting the central control apparatus and the lighting unit control apparatus;
wherein the central control apparatus is operable to:
receive a configuration request, optimization objectives/constraints, as well as lighting requirements, illuminance model, and cost model to illuminate a coverage area associated with the configuration request;
identify the lighting units operably connected to the lighting unit control apparatus associated with the configuration request;
update at least one of the lighting requirements, the illuminance model, and the cost model when at least one of the lighting requirements, the illuminance model, and cost model has changed;
generate instructions to optimize operation of the identified lighting units as a function of the optimization objectives/constraints, the lighting requirements, the illuminance model, and the cost model; and
send the instructions to the lighting unit control apparatus to direct the identified lighting units to operate in accordance with the optimized operation.

2. The system of claim 1 wherein the central control apparatus is further operable to:
receive operation measurements for a first area of interest;
determine whether the operation measurements are within a desired performance range;
update the illuminance model when the operation measurements are not within the desired performance range;
determine whether the cost model has changed;
update the cost model when the cost model has changed;
optimize operation of the identified lighting units as a function of the optimization objectives/constraints, the lighting requirements, the illuminance model, and the cost model; and
send an operation instruction to the lighting unit control apparatus to direct the identified lighting units to illuminate the coverage area in accordance with the optimized operation.

3. The system of claim 2, wherein the central control apparatus is further operable to:
identify measurement needs for a second area of interest;
check mobile sensing device availability for the second area of interest;
determine whether a probe is needed in light of the mobile sensing device availability;
probe for available mobile sensing devices when the probe is needed; and
collect the operation measurements from the available mobile sensing devices.

4. The system of claim 3, wherein the central control apparatus is further operable to:
configure a measurement window for the measurement needs, the measurement window including area of interest (AOI) identification, measurement period specification, report mode, and measurement type; and
collect the operation measurements from the available mobile sensing devices in accordance with the measurement window.

5. The system of claim 3, wherein the central control apparatus is further operable to de-identify information uniquely associated with one of the available mobile sensing devices.

6. The system of claim 3, wherein the central control apparatus is further operable to:
direct the available mobile sensing devices to execute specific measurements;
receive measurement results from the specific measurements; and
determine whether the available mobile sensing devices are correctly calibrated from the received measurement results,
wherein the specific measurements are specific measurements for a selected lighting unit.

7. The system of claim 3, wherein the central control apparatus is further operable to:
- request a user of one of the available mobile sensing devices to place the one of the mobile sensing devices at a selected position having a known lighting value;
- perform at least one lighting measurement with the one of the available mobile sensing devices; and
- calibrate the one of the available mobile sensing devices against the known lighting value based on the at least one lighting measurement,
- wherein the known lighting value is obtained from one of a reference light sensor and a pre-calibrated mobile sensing device,
- wherein the reference light sensor is associated with a particular lighting unit, and the processor (410) is further operable to request a user of one of the available mobile sensing devices to place the one of the mobile sensing devices at the particular lighting unit.

8. The system of claim 2, wherein a mobile sensing device is operable to:
- react to commands from the central control apparatus;
- configure a measurement window;
- perform a measurement for the measurement window; and
- report the measurement to the central control apparatus,
- wherein the mobile sensing device includes user software downloadable from the central control apparatus,
- wherein the mobile sensing device is operable to allow a user to register the mobile sensing device with the central control apparatus and
- wherein the mobile sensing device is operable to allow the user to configure default measurement window.

9. The system of claim 2, wherein the central control apparatus is further operable to:
- register mobile sensing devices;
- request users to perform measurements with the registered mobile sensing devices; and
- provide benefits to the users in response to the users performing the measurements with the registered mobile sensing devices.

10. The system of claim 1, wherein the central control apparatus is further operable to optimize operation of the identified lighting units by searching a searchable solution database, and wherein the central control apparatus is further operable to run a real-time calculation when a solution is not found in the searchable solution database.

11. A central control apparatus to optimize an outdoor lighting network (OLN) including a plurality of lighting units, the apparatus comprising:
- a processor;
- a memory operably connected to the processor; and
- a communication module operably connected to the processor for communication with the outdoor lighting network;
- wherein the processor is operable to:
  - receive a configuration request, optimization objectives/constraints, as well as lighting requirements, illuminance model, and cost model to illuminate a coverage area associated with the configuration request;
  - identify the lighting units associated with the configuration request;
  - determine whether at least one of lighting requirements, illuminance model, and cost model have changed;
  - update at least one of the lighting requirements, the illuminance model, and the cost model when at least one of the lighting requirements, the illuminance model, and cost model them has changed;
  - generate instructions to optimize operation of the identified lighting units as a function of the optimization objectives/constraints, the lighting requirements, the illuminance model, and the cost model; and
  - direct the identified lighting units to illuminate the coverage area in accordance with the optimized operation.

12. The apparatus of claim 11, wherein the processor is further operable to:
- receive operation measurements for a first area of interest;
- determine whether the operation measurements are within a desired performance range;
- update the illuminance model when the operation measurements are not within the desired performance range;
- determine whether the cost model has changed;
- update the cost model when the cost model has changed;
- optimize operation of the identified lighting units as a function of the optimization objectives/constraints, the lighting requirements, the illuminance model, and the cost model; and
- direct the identified lighting units to illuminate the coverage area in accordance with the optimized operation.

13. The apparatus of claim 12, wherein the processor is further operable to:
- identify measurement needs for a second area of interest;
- check mobile sensing device availability for the second area of interest;
- determine whether a probe is needed in light of the mobile sensing device availability;
- probe for available mobile sensing devices when the probe is needed; and
- collect the operation measurements from the available mobile sensing devices.

14. The apparatus of claim 13, wherein the processor is further operable to:
- configure a measurement window for the measurement needs, the measurement window including area of interest (AOI) identification, measurement period specification, report mode, and measurement type; and
- collect the operation measurements from the available mobile sensing devices in accordance with the measurement window.

15. The apparatus of claim 13, wherein the processor (410) is further operable to:
- request a user of one of the available mobile sensing devices to place the one of the mobile sensing devices at a selected position having a known lighting value;
- perform at least one lighting measurement with the one of the available mobile sensing devices; and
- calibrate the one of the available mobile sensing devices against the known lighting value based on the at least one lighting measurement,
- wherein the known lighting value is obtained from one of a reference light sensor and a pre-calibrated mobile sensing device, and wherein the reference light sensor is associated with a particular lighting unit, and the processor is further operable to request a user of one of the available mobile sensing devices to place the one of the mobile sensing devices at the particular lighting unit.

* * * * *